United States Patent Office 3,661,941
Patented May 9, 1972

3,661,941
PROCESS FOR PREPARATION OF 3β-HYDROXY A/B CIS STEROIDS OF THE CHOLESTANE SERIES
Jerry R. Dias, 865 Carlisle Way, Sunnyvale, Calif. 94087, and George R. Pettit, 6232 Bret Hills Drive, Paradise Valley, Ariz. 85253
No Drawing. Filed Oct. 9, 1970, Ser. No. 79,667
Int. Cl. C07c 169/22
U.S. Cl. 260—397.3                                    6 Claims

ABSTRACT OF THE DISCLOSURE

There is provided a novel procedure for converting a 3β-hydroxy-17-oxo-androst-5-ene into a 3β-hydroxy A/B cis-steroid of the cholestane series, thus providing a new and useful route for the preparation, inter alia of bufalin and resibufogenin from readily available materials.

FIELD OF THE INVENTION

Synthesis of bufalin.

DESCRIPTION OF THE PRIOR ART

Several syntheses of bufalin are now known. The most recent by Pettit et al. is reported briefly in Chem. Comm. 93 (1970) and more fully in J. Org. Chem. 35, 2895, 1970. This synthesis however requires as a starting material an available, but nonetheless expensive compound, digitoxigenin. Thus syntheses starting with readily avail- and cheap starting materials are therefore worthy of attention.

One approach was reported by Pettit et al., Can. J. Chem. 2512, 47 (1969). This approach requires the synthesis of a 3β-hydroxy-5α,14α-bufadienolide which may then be subsequently converted into the desired 3β-hydroxy-5β,14β-hydroxy analog, namely bufalin.

SUMMARY OF THE INVENTION

The present invention concerns a reaction sequence in the synthesis of bufalin from readily available starting materials, namely from 3β-hydroxy-17-oxo-androst-5-ene and 3β-alkanoates thereof. The process of the present invention is an improvement over the process of Pettit et al. (Can. J. Chem. 2511, 47, 1969) in that the transformation of the A/B ring junctures from A/B trans to A/B cis achieved before the formation of the somewhat sensitive 2-pyrone ring.

The 3β - hydroxy-17-oxo-androst-5-ene is formylated and converted to the corresponding 3β-hydroxy-20-cyano-21-nor-pregn-5,17(20)-diene 3β-formate (II) by a Wittig reaction utilizing a dialkyl cyanomethyl phosphonate in the presence of a base. The C—C double bonds are then reduced and the 3-oxo group introduced. This may be achieved either by Oppenauer oxidation of compound (II) to the corresponding 3-oxo-Δ⁴ compound (III) followed by catalytic hydrogenation to the 3-oxo-20-cyano-21-nor-5β-pregnane (VIb) or by catalytic reduction of compound (I) to reduce the 17(20) double bond, followed by Oppenauer oxidation to the 3-oxo-20-cyano-21-nor-pregn-4-ene (V) which is then further catalytically reduced to give compound (VIb).

The 3-oxo group of compound (VIb) is then reduced to the corresponding 3β-hydroxy group with chloriridic acid in the presence of a trialkyl phosphite followed by saponification of the 17-cyanomethyl group and acylation of the 3β-hydroxy group to yield the acid (VIII). Rosenmund reduction yields the 3-hydroxy-5β-pregnan-21-al 3-acylate (IX).

The aldehyde (IX) is converted into a corresponding enamine and condensed with an alkyl acrylate to yield the corresponding alkyl 3β-acyloxy-20-formyl-21-nor-5β-cholanate (X) which is subjected to ring closure condensation under acid conditions to yield the corresponding 3β-acyloxy-5β-buf-20(21)-enolide (XI), which is then dehydrogenated to the corresponding bufadienolide (XII).

A 14β-hydroxy group is then inserted into the molecule. This is obtained by hydration of a Δ¹⁴ bond. The Δ¹⁴ bond may be obtained by several routes, among those well known in the art are the microbial hydroxylations at C-15, using for example, Fusarium orthoceras (Camerino et al., Gazz. Chim. Ital. 86, 126 (1956)); F. oxysporum, F. lini, F. vasinfectum, F. moniliforme, F. concolor, G. Zeae and G. Cyanea (Murray and Meister U.S. Pat. 2,899,255). Alternatively hydroxylation may occur at 14α. Among the microorganisms capable of carrying out such oxydation may be mentioned Helmintheosporium buchloes (De Flines et al., Rec. Trav. Chim. 82, 149 (1963)).

Upon hydroxylation the 14α or 15α hydroxy steroid (XX) is dehydrated to give the desired Δ¹⁴ compound (XXI). The dehydration is carried out under acid conditions in accordance with the method of Engle et al. (Can. J. Chem. 1968, 46, 733). It is preferred to utilize the 14α-hydroxy compounds to the 15α-hydroxy compound since the possibility of obtaining undesired by-products is reduced.

The Δ¹⁴ compound (XXI) is epoxidised to give the desired 14,15-epoxide (XXII). The acyloxy group at 3 is then removed by hydrolysis on alumina to yield resibufogenin (XXIII).

Reduction of resibufogenin (XXIII) by lithiumaluminum hydride in very cold anhydrous conditions yields bufalin (XXIV).

DESCRIPTION OF THE PREFERRED EMBODIMENTS

3β-hydroxy-17-oxo-androst-5-one is formylated, suitably by reaction with acetic/formic anhydride in pyridine and worked up in the usual manner to give the 3β-formate (I).

3β-hydroxy-17-oxo-androst-5-ene 3β-formate is converted to the corresponding 17-cyanomethylene compound (II) by the method of Bose and Dahill (J. Org. Chem. 30, 505 [1965]). In this procedure there is added, suitably dropwise, a solution of a dialkyl cyanomethyl phosphonate, suitably the dimethyl ester in a suitable solvent, preferably an ethereal solvent such as tetrahydrofuran, to a suspension of a strong base in a similar solvent. It has been found useful to utilize an alkali metal hydride such as sodium hydride or the like for this purpose. There are utilized 1 to 2 moles, suitably 1 to 1.5 moles of phosphonate per mole of hydride. The reaction is carried out at reduced temperatures, ice bath temperature being especially convenient.

To the resultant solution is added the 3β-hydroxy-17-oxo-androst-5-ene 3β-formate (I) in a similar solvent. There are utilized between 0.3 and 0.6 suitably 0.35 and 0.45 mole of steroid per mole of phosphonate originally charged.

The reaction mixture is then allowed to stand suitably at room temperature for from about 18 to about 36, suitably for about 24 hours, concentrated, quenched with water and refrigerated at from about 0°–5° C. for 3 to 10 hours. The product, 3β-hydroxy-20-cyano-21-norpregna-5,17(20)-diene 3β-formate (II) is obtained as a precipitate, which, however, contains some 3β-hydroxy material which is reformylated in the usual manner. Certain steps in the synthesis of the present invention could have been avoided if the carboxymethyl group could have been directly introduced into the 17-position of the nucleus. Such a synthesis was attempted using diethyl carbethoxymethyl phosphonate, however, this approach was not successful.

The compound (II) is then converted to the corresponding 3-oxo-20-cyano-21-nor-5β-pregnane (VIb).

In one alternate approach compound (II) is subjected to an Oppenauer oxidation to yield the corresponding 3-oxo-20-cyano-21-nor pregna-4,17(20)-diene (III) which is then reduced to compound (VIb) by catalytic hydrogenation.

While it is known that in catalytic hydrogenations of this type, the 5β to 5α ratio is favored in the direction of 5β by a basic environment, it was found that using a basic solvent such as N-methylpyrrolidone led to undesirable by-products.

The reduction is therefore carried out in a polar, non-hydroxylic solvent such as tetrahydrofuran or acetonitrile using palladium on calcium carbonate as the catalyst; suitably as 5% palladium on calcium carbonate. The reduction is suitably carried out under ambient conditions of temperature and pressure. Reduction is complete in between 3 and 7 hours.

Alternatively, the diene (II) is first reduced to yield the 3β-hydroxy-20-cyano-21-nor-pregn-4-ene 3β-formate (IV) by hydrogenation under conditions similar to those above. The reduction, however, takes somewhat longer; from about 36–about 60 hours. Compound (IV) is then subjected to an Oppenauer oxidation to yield the 3-oxo-20-cyano-21-nor-pregn-5-ene (V) which is reduced in a manner similar to that above, however the reduction time is of the order of 8–12 hours.

Whichever route is utilized the 5β to 5α ratio is about 3:1.

The reduction product is separated by chromatography on silica gel using slow elution with relatively mild polarity progression. A 100:1 ratio of gel to steroid is suitable. Initial elution with petroleum ether yields the 5α component, benzene elution yields a mixture of 5α and 5β components, and benzene/ethyl acetate (20:1) yields the 5β component only. The middle fractions are then rechromatographed.

The 3-oxo group is then reduced to the 3β-hydroxy group.

In the preferred modification the 3-oxo compound (VIb) is taken up in a lower alkanol suitably 2-propanol and heated under reflux with chloridic acid in the presence of a trialkyl phosphite, suitably trimethyl phosphite. There is utilized an excess, say a 50 to 100% molar excess of the trialkyl phosphite and a catalytic amount, say 10 molar percent of the chloriridic acid. The mixture is heated under reflux for from about 40 to about 80 hours. The reaction mixture is then quenched with water and the aqueous suspension extracted with a water immiscible solvent to yield, on evaporation the corresponding 3β-hydroxy-5β-steroid (VIIb).

The 3β-hydroxy-20-cyano-21 nor-5β-pregnane (VIIb) is saponified and acylated. In the preferred procedure the steroid is taken up in a suitable solvent and heated in the presence of a base. A mixture of water and water soluble organic solvents has been found useful. A mixture of a lower alkanol such as methanol and dioxane is particularly favoured. As a base, an alkali such as potassium hydroxide may be used, a substantial excess thereof being preferred.

The reaction mixture is heated, suitably under reflux for about 48 to about 72 hours, quenched with water and acidified, preferably with a concentrated mineral acid such as hydrochloric acid. The acidified mixture is cooled to about 0° to about 5° C., for about 3 to about 72 hours and the precipitated product collected, dried and acylated, suitably acetylated with say, acetic anhydride in pyridine in the usual manner.

The acid (VIII) is then reduced to the corresponding aldehyde. In the preferred modification the acid is treated with a suitable acid halide, thionyl chloride or oxalyl chloride being preferred, in a suitable solvent, preferably a hydrocarbon solvent such as benzene or the like. Suitably there is added a solution of 2–4 moles of oxalyl chloride per mole of acid in benzene to an ice cold solution of acid (VII) in the same solvent. The resultant mixture is allowed to stand, suitably at ambient temperature for from about 1 to 30 hours, suitably for about 15 hours. The solvent is then evaporated, residual oxalyl chloride being removed by resolution in benzene followed by reevaporation.

The acid chloride is then reduced by catalytic hydrogenation. 10% palladium on barium sulfate has been found to be a suitable catalyst. The acid chloride is dissolved in a reaction inert, high boiling hydrocarbon solvent, suitably toluene or xylene, the catalyst added thereto and the reaction mixture hydrogenated.

It has been found that yields are improved by maintaining the bath temperature at between about 90° to about 95° C. and the hydrogen pressure in the reaction vessel at slightly under atmospheric pressure. The reaction is complete in from about 1 to about 3 hours. Column chromatography yields 3β-acetoxy-5β-pregnan-21-al (IX).

The 3β-acyloxy, preferably the 3β-acetoxy-5β-pregnan-21-al (IX) prepared in accordance with the procedures described hereinabove is converted into the corresponding alkyl or aralkyl 3β-acetoxy-20-formyl-20-nor-5β-cholanate (X). In the preferred procedure the aldehyde (IX) is converted into the corresponding enamine. Suitably the aldehyde is taken up in a dry reaction inert, hydrocarbon solvent such as toluene, xylene, or the like, or in acetonitrile and treated with a secondary amine, preferably a heterocyclic amine such as morpholine, pyrrolidine, or, most suitably piperidine in the presence of anhydrous mild base, alkali metal carbonates such as potassium carbonate being especially suitable. Alternatively molecular sieves may be used. There is utilized an excess of amine, suitably a 100 to 200% excess, but the degree of excess is not critical. The reactants are stirred, suitably at ambient temperature for from 1 to 6 hours, three hours usually being sufficient. The reaction mixture is then worked up. In the preferred method the reaction mixture is filtered and the filtrate evaporated to dryness, redissolved in fresh dry solvent and reevaporated to remove the last traces of amine. The enamine is then taken up in a reaction inert solvent such as dimethylformamide, dimethyl sulfoxide, tetrahydrofuran or formal may be used, acetonitrile being especially suitable. A small excess, say a 50% excess of alkyl or aralkyl acrylate is then added and the mixture heated under reflux. Among the suitable acrylates are methyl-, ethyl-, propyl-, butyl-, and benzylacrylates. The heating under reflux proceeds for from about 40 to about 80 hours. The only critical feature in both the first and the second stages of the reaction is the anhydrous nature of the environment. The reactions should be carried out in a dry atmosphere, preferably a nitrogen atmosphere in dry solvents. The solvents are previously dried by distillation into the reaction vessel from phosphorus pentoxide.

The condensation reaction is quenched by the addition of aqueous acid, suitably a moderately strong organic acid, such as aqueous acetic acid or the like. The quenching is completed by heating the mixture under reflux for about one hour. The reaction mixture is cooled and worked up in the usual manner to yield the corresponding alkyl or aralkyl 3β-acetoxy-20-formyl 21-nor-5β-cholanic ester (X). The aldehyde ester is then subjected to ring closure to form the 3β-acetoxy-5β-buf-20(21)-enolide (XI). In the preferred procedure the ester is saponified to the corresponding acid. Suitably the ester is taken up in a suitable water miscible solvent, tetrahydrofuran/methanol being suitable and aqueous base added thereto. Alkali metal carbonates such as 5% aqueous sodium carbonate or the like are suitable. The mixture is held at ambient temperatures for from about 1 to about 5 hours and worked up in the usual manner to yield the acid.

The acid is then subjected to ring closure to yield the desired buf-20(21)-enolide (XI). Strong organic acids and certain Lewis acid have been found to be satisfactory lactonising agents. Among the organic acids may be mentioned p-toluene sulfonic acid, methane sulfonic acid and the like. The suitable Lewis acids include Bronsted acid, polyphosphoric acid, boron trifluoride and thallium tri(trifluoroacetate). The use of the common lactonizing agent acetic anhydride/sodium acetate is not favored. The reactants are taken up in a suitable hydrocarbon solvent such as benzene, toluene and the like. There is utilized between 5 and 15% by weight, suitably about 10% by weight of lactonizing agent based on aldehydic ester (X). The reaction may proceed at temperatures of between about 20° and about 120° C. Since water is generated during the reaction and the presence of water is unfavorable to the desired reaction equilibrium, it is preferred to carry out the reaction at reflux temperatures, removing the water/solvent azeotrope by continuous distillation, suitably by means of a Dean-Stark trap. It has been found particularly effective to charge 4-A type molecular sieve into the Dean-Stark trap. The reaction time will vary with the catalyst used, however, the reaction times of between about 10 and about 30 hours have been found adequate to remove all of the water produced. The buf-20(21)-enolide (XI) is then isolated, suitably by evaporation of the solvent, and chromatography on a silica gel column.

The buf-20(21)-enolide (XI) is then dehydrogenated to the 3β-acetoxy-5β-bufa-20,22-dienolide (XII). The usual dehydrogenation agents were found capricious. However especially fine results have been obtained using sulfur as the dehydrogenating agent.

In the preferred modification of the method the buf-20(21)-enolide (XI) is taken up in a solution of sulfur in carbon disulfide. The carbon disulfide is evaporated to give a finely divided and intimate mixture of the reactants. There is utilized a large excess of sulfur, between 2 and 4 parts by weight of sulfur relative to the buf-20(21)-enolide have been found suitable. The mixture is then heated, suitably under a gentle flow of inert gas, nitrogen being preferred. Preferably, heating is carried out in a metal bath, to bath temperature of between 180 and 250° C., suitably between about 200 and 225° C. for from about 15 to 30 minutes. The optimum conditions may be determined by sampling and analysis of the samples by thin layer chromatography. The product is extracted with a suitable solvent and purified, chromatography being a suitable mode of purification.

The thus produced dienolide may then be converted to resibufogenin or bufalin.

The compound (XII) is subjected to hydroxylation at 14α or 15α suitably by the microbiological routes set forth hereinabove, to yield compounds (XXa and b), which are then dehydrated. In the preferred modification, compound (XX) is taken up in an anhydrous medium such as benzene, toluene, or the like and treated with a strong acid, suitably a mineral acid, gaseous hydrochloric acid being preferred. The gas is preferably passed for about 2 hours and the solvent and surplus gas removed by evaporation to yield the desired 14-dehydro product (XXI).

The thus produced 3β-acetoxy - Δ¹⁴ - dehydrobufalin (XXI) is then taken up in a suitable reaction inert solvent, suitably a chlorinated hydrocarbon solvent such as chloroform or methylene chloride and treated with an excess of per acid. It is generally preferred to use an organic per acid, chloroperbenzoic acid being particularly suitable. The reaction is run for from about 3 to about 6 hours at ambient temperature. The reaction is then quenched by the addition of aqueous base, suitably sodium hydroxide to destroy the excess per acid. The reaction mixture is then extracted to yield, on work up, the cardiac active agent, resibufogenin acetate (XXII).

Resibufogenin 3β-acylate, suitably the 3β-acetate (XXII) is subjected to very mild hydrolysis to remove the acyloxy group. Where the acyloxy group is the acetoxy group it is removed by mixing an ethereal solution of (XXII) with active basic alumina and pouring the slurry into a column. The mixture is allowed to stand for about 18 to about 36 hours at ambient temperature. Elution with ether/chloroform yields resibufogenin (XXIII) which may be readily recrystallized from chloroform/methanol.

Where it is desired to produce bufalin, compound (XXIII) is taken up in a dry ethereal solvent, suitably tetrahydrofuran or diethylether, and treated with a slight excess, say a 10–20% molar excess of lithiumaluminum hydride at low temperatures, suitably at −70 to −40° C. The reaction may be quenched either with wet ether or aqueous hydrochloric acid. The aqueous mixture is then extracted with a water immiscible solvent, which, upon evaporation after the usual workup gives bufalin (XXIV).

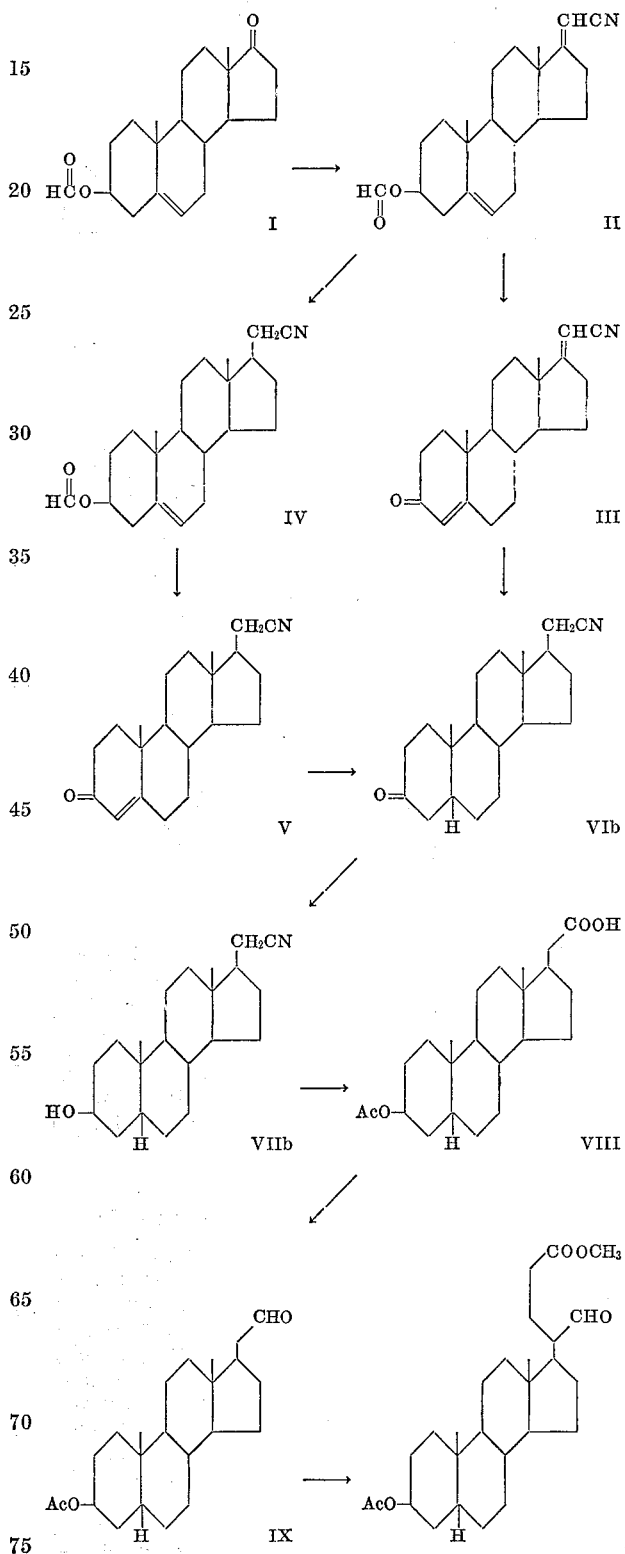

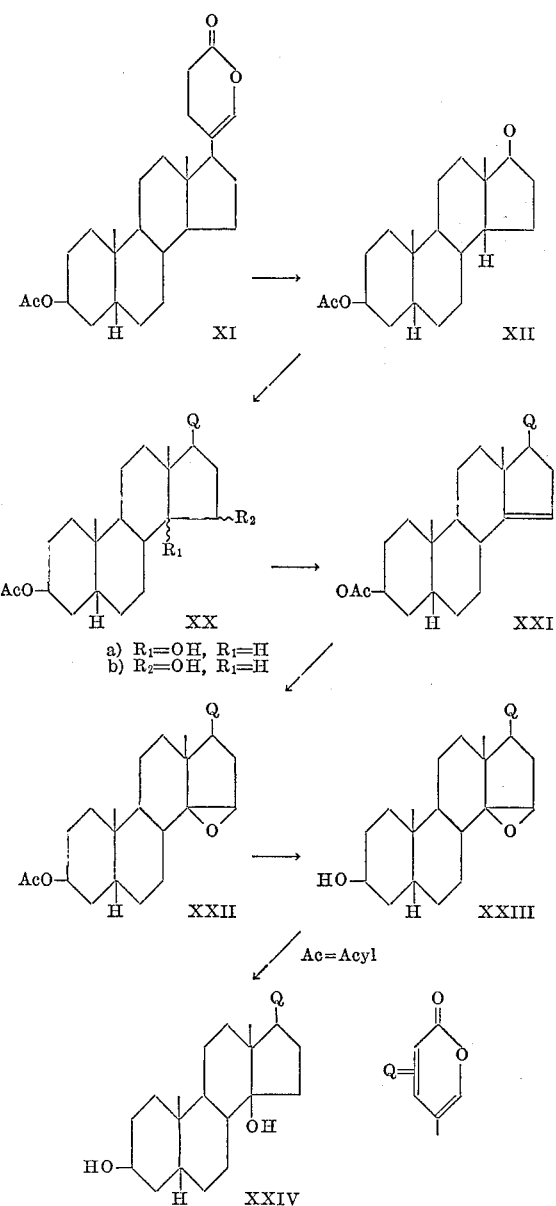

a) R₁=OH, R₂=H
b) R₂=OH, R₁=H

Ac=Acyl

Acetic-formic anhydride is prepared by slowly adding 1 volume of 100% formic acid to 2 volumes of acetic anhydride at 0°. Acetonitrile (from phosphorus pentoxide), diethyl cyanomethylphonate (Aldrich, $n_D^{20}$ 1.4315), piperdine, and trimethyl phosphite are redistilled. Acetonitrile is stored over molecular sieves (4A), and piperidine is stored over potassium hydroxide pellets. Sodium hydride is dispersed in mineral oil (53.6% NaH). All temperatures are in degrees centigrade.

EXAMPLE I

3β-hydroxy-17-oxo-androst-5-ene 3β-formate (I)

3β-hydroxy-17-oxo-androst-5-ene (11.41 g.; 0.0396 m) is dissolved in pyridine (35 ml.) and acetic-formic anhydride (25 ml.) is added dropwise to the mixture on an ice bath. After stirring at room temperature for 30 minutes, the reaction mixture is poured into water (500 ml.) and refrigerated for 5 hours. Filtration yields 12.5 g. (99%) 3β-hydroxy-17-oxo-androst-5-ene 3β-formate as a fluffy white solid: M.P. 147–148°; $\nu_{max}$. (KBr) 2980, 1740 (C–17 carbonyl), 1700 and 1175 K (formate carbonyl, shoulder at 1670); pmr 485 (s, 1p, formate proton), 328 (d, 1p, C–6), 285 Hz. (hump, 1p, C–3), 148 and 140 (m, 1p, C–16), 90 (methylene envelope), 65 Hz. (s, 3p, C–19), and 54 Hz. (s, 3p, C–18); RD (absolute EtOH; c, 0.106) at 25–26° $[\alpha]_{589}$ −3.4°, $[\alpha]_{520}$ 0.000, $[\alpha]_{500}$ +2.5°, $[\alpha]_{400}$ +64°, $[\alpha]_{350}$ +290°, $[\alpha]_{320}$ +1695 (peak), $[\alpha]_{296}$ 0.000, $[\alpha]_{385}$ −1954, $[\alpha]_{270}$ −2689° (through), $[\alpha]_{250}$ −2340° (positive Cotton effect).

Analysis.—Calcd. for $C_{20}H_{28}O_3$ (316.4) (percent): C, 75.91; H, 8.92. Found (percent): C, 75.71; H, 8.77.

EXAMPLE II

3β-hydroxy-20-cyano-21-nor-pregna-5,17(20)-diene 3β-formate (II)

Diethyl cyanomethylphosphonate (9.0 g.) in tetrahydrofuran (75 ml.) is added dropwise to a stirred suspension of sodium hydride (2.25 g.) in tetrahydrofuran (150 ml.) at 0.5° (ice bath). To the resulting clear yellow solution is added 3β-formoxy-17-oxo-5-androstene (I) (9.25 g.) in tetrahydrofuran (75 ml.). After standing at room temperature for 26 hours, the solution is concentrated (to 100 ml.). Water (500 ml.) is added and the mixture refrigerated for 5 hours. The collected solid contains some alcohol which is reformylated by dissolving in pyridine (25 ml.), chilling, adding acetic-formic anhydride (6 ml.), and pouring into ice water (500 ml.) after 5 minutes elapses. This gives 8.0 g. (80%) of solid of which recrystallization of a portion from ethyl acetate-pet ether yielded an analytical sample: of 3β-hydroxy-20-cyano-21-nor-pregn-5,17(20)-diene-3β-formate (II) M.P. 181–185° (white plates); $\nu_{max}$. (KBr) 2960, 2210 (wk C≡stret), 1720 and 1180 (formate, 1635 (wk C=C—CN stret), and 940 wk C=C—H bend); pmr 326 (broad, 1p, C–6), 308 (t, 1p, J=2 Hz., C–20 vinyl proton coupled with C–17 allylic protons), 283 (hump, 1p, C–3 proton), 148 (m, 6p, C–4 and C–7 and C–16 allylic protons), 95 (methylene envelope), 63 (s, 3p, C–19), and 60 Hz. (s, 3p, C–18), RD (dioxane, c, 0.313) $[\alpha]_{650}$ −35, $[\alpha]_{589}$ −48, $[\alpha]_{500}$ −67, $[\alpha]_{400}$ −134, $[\alpha]_{300}$ −350, $[\alpha]_{250}$ −910 (plain curve).

Analysis.—Calcd. for $C_{22}H_{29}NO_2$ (339.5) (percent): C, 77.84; H, 8.61; O, 9.43; N, 4.13. Found (percent): C, 77.81; H, 8.86; O, 9.29; N, 4.04.

EXAMPLE III 3-oxo-20-cyano-21-nor-pregna-4,17(20)-diene (III)

After distilling 20 ml. of solvent to remove the moisture from a solution of 3β-hydroxy-20-cyano-21-nor-pregna-5,17(20)-diene 3β-formate (II) (3.35 g.) in xylene (110 ml.) and cyclohexanone (41 ml.), aluminum isopropoxide (4.1 g. in 17 ml. of xylene) is added to the hot mixture; this addition is accompanied by yellowing and gassing. After heating at reflux for 1.5 hours, water (75 ml.) is added, and the cyclohexanone removed by steam distillation. The reaction mixture is refrigerated and the aqueous residue decanted through a filtering pad, the alumina sludge retained in the flask then collected on the filtering pad and extracted with acetone and then chloroform. Evaporation of the solvent yields a yellow oil which is chromatographed through a column of silica gel (100 g. of 0.2–0.5 mm.). This gave 2.9 g. (94%) 3-oxo-20-cyano-21-nor-pregna-4,17(20)-diene (III), as white needles: M.P. 158–165°; $\nu_{max}$. (KBr) 2960, 2210 (wk C≡N stret), 1670 (conjugated C=O stret), 1635 (wk C=C=N stret), 1610 (wk C=C—CO stret) and 950 (wk C=C—H bend); pmr 344 (s, 1p, C–4 vinyl proton), 308 (t, 1p, J=2 c.p.s., C–20 vinyl proton coupled with C–16 allylic protons), 150 (m, 6p, C–2 and C–6 and C–16 protons), 95 (methylene envelope), 73 (s, 3p, C–19 methyl), and 61 Hz. (s, 3p, C–18 methyl) RD (dioxane c. 0.195) $[\alpha]_{650}$ +110, $[\alpha]_{589}$ +1210, $[\alpha]_{400}$ +320, $[\alpha]_{350}$ +1000, $[\alpha]_{300}$ +2600, $[\alpha]_{260}$ +6100 (irregular curve).

Analysis.—Calcd. for $C_{21}H_{27}NO$ (percent): C, 81.51; H, 8.79; O, 5.17; N, 4.53. Found (percent): C, 81.32; H, 8.97; O, 5.06; N, 4.65.

EXAMPLE IV

3β-hydroxy-20-cyano-21-nor-pregn-5-ene 3β-formate (IV)

3β-hydroxy-20-cyano-21 - nor-pregna - 5,17(20)-diene 3β-formate (22.3 g. in 5 aliquots) is hydrogenated in tetrahydrofuran (1150 ml.) containing 5% palladium on calcium carbonate (22.3 g.) for 48 hours ambient temperature and pressure (730 torr); 1650 ml. of hydrogen is absorbed (theory 1560 ml.). The catalyst is removed by filtration, and the filtrate is concentrated. Chromatography of the yellow solid through a column of silica gel yields 19.2 g. (86%) of 3β-hydroxy-20-cyano-21-nor-pregn-5-ene 3β-formate (IV): M.P. 147.5–150° (prisms for EtDAc); $\nu_{max.}$ (KBr) 2960, 2250 (wk C≡N stret), 1720 and 1180 (formate), 1450, 1370 (med), 1180 (C—O stret), and 950 (med C=C—H bend); pmr 324 (broad, 1p, C–6), 285 (hump, 1p, C–3α proton), 140 (m, 6p, C–4 and C–7 and C–20), 90 (methylene envelope), 63 (s, 3p, C–19) and 40 Hz. (s, 3p, C–8).

*Analysis.*—Calcd. for $C_{22}H_{31}NO_2$ (341.5) (percent): C, 77.37; H, 9.15; N, 4.10. Found (percent): C, 77.46; H, 9.27; N, 4.28.

EXAMPLE V

3-oxo-20-cyano-21-nor-pregn-4-ene (V)

To remove the moisture from a solution of 3β-hydroxy-20-cyano-21-nor-pregna-5,17(20)-diene 3β-formate (13.35 g.) in xylene (300 ml.) and cyclohexanone (120 ml.), 40 ml. of solvent is distilled off. Aluminum isopropoxide (15 g. in 35 ml. of xylene) is then added to the hot reaction mixture; this addition is accompanied by yellowing and gassing. After heating at reflux for 1.5 hours, the reaction mixture is steam distilled and refrigerated. The refrigerated residue is decanted through a filtering pad. The alumina sludge in the flask and on the filtering paper is extracted with ethyl acetate (300 ml. in several aliquots). Evaporation of the ethyl acetate solvent in a strong hood draft yields cubic crystals which are collected by filtration and washed with petroleum ether, this gave 10.25 g. (84%) of 3-oxo-20-cyano-21-nor-pregn-4-ene (V) M.P. 146.5–149.5°; $\nu_{max.}$ (KBr) 2960, 2250 (wk C≡N stret), 1380 (med), and 865 (med C=C—H bend); pmr 344 (s, 1p, C–4 vinyl proton), 136 (m, 6p, C–2 and C–6 and C–20 protons), 90 (methylene envelope), 72 (s, 3p, C–19), and 42 Hz. (s, 3p, C–18).

*Analysis.*—Calcd. for $C_{21}H_{29}NO$ (311.5) (percent): C, 80.98; H, 9.38; O, 5.14; N, 4.50. Found (percent): C, 80.95; H, 9.58; O, 4.88; N, 4.59.

EXAMPLE VI

3-oxo-20-cyano-21-nor-5α-pregnane (VIa) and 3-oxo-20-cyano-21-nor-5β-pregnane (VIb)

3-oxo-20-cyano-21-nor-pregn-4-ene (V) (7.62 g.) in acetonitrile containing a suspension of 5% palladium on calcium carbonate (7.62 g.) is hydrogenated for 10 hours. The catalyst is removed by filtration, washed well with acetonitrile, the filtrate concentrated. The residue obtained is column chromatographed through silica gel (700 g. of 0.05–0.20 mm.), eluting first with petroleum ether (B.P. 60–90°) for 1 day, then with benzene for 3 or 4 days until much of the product is eluted, and finally with benzene-ethyl acetate (20:1). The first fractions consist of the 5α product, the middle fractions are a mixture of 5α and 5β, and the latter fractions consist of the 5β product; the middle fractions are rechromatographed. This yields 2.6 g. (34%) of the 5α isomer (VIa): M.P. 190–192° (needles from pet ether-benzene); $\nu_{max.}$ (KBr) 2960, 2260 (wk C≡N stret), 1710 (str C=O stret); pmr (benzene) 120 ( m, 4p), 70 (methylene envelope), 35 (s, 3p, C–19), and 14 Hz. (s, 3p, C–18); mass spec M+—15 (44%), M+ 313 (100%); RD (dioxane c, 1.45), $[\alpha]_{589}$ +22°, $[\alpha]_{450}$ +56°, $[\alpha]_{350}$ +178°, $[\alpha]_{312}$ +656° (peak), $[\alpha]_{292}$ 0.0°, $[\alpha]_{285}$ −352°, $[\alpha]_{268}$ −678° (trough), $[\alpha]_{250}$ −505° (positive Cotton effect). There are also obtained 4.2 g. (55%) of the 5β isomer (VIb): M.P. 142–144° (plates from pet ether-benzene); $\nu_{max.}$ (KBr) 2960, 2260, 1710, fingerprint region distinctly different from that for the 5α isomers; pmr (benzene) 120 (m, 4p, C–2 and C–4) 70 (methylene envelope), 43 (s, 3p, C–18), and 17 Hz. (s, 3p, C–18): mass spec M+ 15 (15%), M+ 313 (100%); RD (dioxane c, 145), $[\alpha]_{589}$ +19°, $[\alpha]_{450}$ +31°, $[\alpha]_{370}$ +36° (hump), $[\alpha]_{325}$ 0.0°, $[\alpha]_{311}$ −128° (trough), $[\alpha]_{298}$ 0.0°, $[\alpha]_{290}$ +199°, $[\alpha]_{267}$ +411° (peak) (negative Cotton effect).

*Analysis.*—Calcd. for $C_{21}H_{31}NO$ (313.5) (percent): C, 80.46 H, 9.97; O, 5.10; N, 4.47. Found for VIb (percent): C, 80.46; H, 10.02; O, 5.01; N, 4.51.

Method B.—3-oxo-20-cyano-21-nor-pregna-4,17(20)-diene (III)

3-oxo-20-cyano-21-nor-pregna - 4,17(20) - diene (III) (3.79 g.) in tetrahydrofuran (20 ml.) containing 5% palladium on calcium carbonate is hydrogenated for 5 hours at ambient temperature and pressure (730 torr); 600 ml. of hydrogen are absorbed (theory 600 ml.). The catalyst is removed by filtration and washed well with chloroform. The solvent extract is concentrated and the yellow oil thus obtained is purified as in Method A. This gives 1.17 g. (30%) of 5α- isomer (VIa) of M.P. 190–192° and 1.70 g. (45%) of 5β isomer (VIb): spectra are identical to that given above.

EXAMPLE VII

3b-hydroxy-20-cyano-21-nor-5β-pregnane

A solution of 3-oxo-20-cyano-21-nor - 5β - pregnane (VIb) (4.34 g.), chloriridic acid (200 mg.), trimethyl phosphite (8.8 ml.) and aqueous 2-propanol (120 ml. containing 10% $H_2O$) are heated at reflux for 60 hours. Water is added (250 ml.) and the aqueous suspension extracted with ether (150 ml. in 3 aliquots) which is evaporated to dryness. Column chromatography of the residue through silica gel (50 g. of 0.05–0.2 mm.) yields 3.24 g. (73%) of 3β-hydroxy-20-cyano-21-nor-5β - pregnane (VIIb) as white needles of M.P. 143–148° (from pet ether-benzene) upon elution with benzene-ethyl acetate (100:1); $\nu_{max.}$ (KBr) 3450 (str O—H stret), 2900 (str C—H stret), 2220 (wk C≡N stret), and 1040 (med C—O stret); pmr 213 (hump, 1p, C–3 axial H), 133 (m, 2p, C–20), 85 (methylene envelope), 49 (s, 3p, C–19), 38 Hz. (s. 3p, C–18).

EXAMPLE VIII

3β-acetoxy-5β-pregnan-21-oic acid (VIII)

A solution of 3β-hydroxy-20-cyano-21-nor-5β-pregnane (VIIb) (2.54 g.), dioxane (63 ml.), methanol (75 ml.), water (25 ml.), and potassium hydroxide (25 g.) are heated at reflux for 64 hours, diluted with water (350 ml.) and conc. hydrochloric acid, and collected as a white solid after refrigerating for 5 hours. The dried in vacuo cream solid is heated with pyridine (26 ml.) and acetic anhydride (13 ml.) for 40 minutes. Water (350 ml.) and conc. hydrochloric acid (26 ml.) are added, the aqueous suspension extracted with ether (240 ml. in 3 aliquots), the ethereal phase washed first with water (400 ml. in 2 aliquots) and then with saturated sodium chloride solution, and evaporated to dryness. The residue is column chromatographed through silica gel (150 g. of 0.2–0.5 mm.); elution with benzene-ethyl acetate yields 2.56 g. (85%) 3β-acetoxy-5β-pregnan-21-oic acid (VIII) M.P. 163–165° (prisms from petroleum ether B.P. 60–110°); $\nu_{max.}$ (KBr) 3450 (med, tails), 2940, 1370, and 1250 K (acetate), 1690 (acid); pmr 450 (hump, 1p, vanishes with $D_2O$ shake), 306 (peak, 1p, equatorial 3α-proton), 124 (s, 3p, 3β-acetate), 85 (methylene envelope), 59 (s, 3p, C–19), and 36 Hz. (s, 3p, C–18).

*Analysis*—Calcd. for $C_{23}H_{36}O_4$ (percent): C, 73.36; H, 9.64. Found (percent): C, 73.21; H, 9.54.

EXAMPLE IX

3β-acetoxy-5β-pregnan-21-al (IX)

A homogeneous solution of 3β-acetoxy-5β-pregnan-21-oic acid (1.75 g.) benzene (45 ml.), and oxalyl chloride (3.3 ml.), are allowed to stand under a calcium chloride drying tube at ambient temperature for 7.5 hours. The benzene solvent and excess oxalyl chloride are removed on a rotating evaporator with the aid of a mechanical pump and 50° oil bath (behind a plexiglass barrier). The amber solid thus obtained is dissolved in toluene (30 ml.), 5% palladium on barium sulfate is added, the mixture heated to reflux and hydrogen was passed through the refluxing black suspension for 3 hours. The hydrogen flow is increased and after another 1.5 hours the volume of the toluene is reduced to 10 ml. and no more hydrogen chloride can be detected with pH paper. Column chromatography through silica gel (60 g. of 0.05–0.2 mm.) yields 1.42 g. (80%) of 3β-acetoxy-5β-pregnan-21-al (IX) as a white solid upon elution with petroleum ether-ethyl acetate (40:1): M.P. 76–83°; $\nu_{max.}$ (KBr) 2950, 2720 (wk aldehyde C—H stret), 1730 and 1250 (acetate), 1715 K (aldehyde C—O stret); pmr 540 (d, $J=2$ Hz., 1p, aldehyde C—H), 307 (peak, 1p, equatorial 3α-proton), 140 (m, 2p, C–20), 124 (s, 3p, acetate methyl), 85 (methylene envelope), 60 (s, 3p, C–19), and 36 Hz. (s, 3p, C–18).

*Analysis.*—Calcd. for $C_{23}H_{36}O_3$ (360.5) (percent): C, 76.62; H, 10.07. Found (percent): C, 77.07; H, 10.39.

EXAMPLE X

Methyl 3β-acetoxy-20-formyl-21-nor-5β-cholanate (X)

A mixture of 3β-acetoxy-5β-pregnan-21-al (1.025 g.), toluene (14 ml.), piperidine (0.70 ml.) and molecular sieves (4A) is allowed to stand at ambient temperature for 6.5 hours. The solvent is removed on a rotating evaporator with the aid of a mechanical pump and 60° oil bath (behind plexiglass barrier); traces of piperidine are removed by addition and evaporation of more toluene (25 ml.). The amber oil is heated at reflux with acetonitrile (12 ml.) and methyl acrylate (0.32 ml.) under nitrogen for 61 hours. Glacial acetic acid (0.3 ml.) and water (4 ml.) are added and heated a further 2 hours under nitrogen. The cool mixture is diluted with ether (30 ml.), and the ethereal phase is washed with saturated sodium chloride solution (60 ml. in 3 aliquots). The solvent is removed and column chromatography of the yellow solid residue through silica gel (60 g. of 0.05–0.2 mm.) yields 0.43 g. (42%) of starting aldehyde (IX) upon elution with petroleum ether (B.P. 30–60°)-ethyl acetate (40:1). Further elution with petroleum ether-ethyl acetate (40:1) yields 0.56 g. (46%) of an epimeric mixture of methyl 3β-acetoxy-20-formyl-21-nor-5β-cholanate (X) product X as a white solid: $\nu_{max.}$ (KBr) 2940, 1730 (broad) and 1250, and 1020 K; pmr 575 (m, 1p, aldehyde proton), 310 (peak, 1p, equatorial 3α-proton), 225 (s, 3p, methyl ester), 126 (s, 3p, acetate), 85 (methylene envelope), 60 (broad s, 3p, C–19) and 42 Hz. (d, 3p, C–18 of epimeric mixture).

In accordance with the foregoing procedure but starting in place of 3β-acetoxy-5β-pregnan-21-al, with 3-β-propoxy-, 3β-butyroxy-, 3β-valeroxy- or 3β-benzoxy-5α-pregnan-21-al, there is obtained the corresponding methyl 3β-acyloxy-20-formyl-21-nor-5β-cholanate.

In accordance with the foregoing procedure but where in place of methyl acrylate, there is used ethyl acrylate, propyl acrylate, butyl acrylate, benzyl acrylate, or phenyl acetyl acrylate there is obtained the corresponding alkyl or aralkyl 3β-acyloxy-20-formyl-21-nor-5β-cholanate.

EXAMPLE XI

3β-acetoxy-5β-buf-20(21)-enolide (XI)

To a solution of methyl 3β-acetoxy-20-formyl-21-nor-5α-cholanate (X) (650 mg.) in tetrahydrofuran (15 ml.), and methanol (6 ml.) is added 10 ml. of 5% aqueous sodium carbonate. The mixture is stirred at room temperature under nitrogen for 2 hours.

A 3 N hydrochloric acid solution (6 ml.) is added and stirred for 30 minutes. The suspension is extracted with ether (160 ml. in 4 aliquots), the ether removed on a rotating evaporator, dried and the oil obtained in vacuo. The white solid thus obtained gives the following pmr: 596 (m, 0.3p, aldehyde proton), 578 (crude doublet, 0.7p, aldehyde proton), 309 (peak, 1p, equatorial 3α-proton), 225 (s, 3p, acetate), 90 (methylene envelope), 59 (broad s, 3p, C–19), and 44 (s, 1p) and 41 Hz. (s, 2p, C–18).

This white solid, dissolved in benzene (70 ml.) containing toluene-sulfonic acid (0.1 g.), (10 ml. of benzene are first distilled off to remove the most of moisture) is heated at reflux under a Dean-Stark containing molecular sieves (4A) for 27 hours under nitrogen. The reaction product is immediately column chromatographed through silica gel (2 5g. of 0.05–0.2 mm.). Elution with benzene (1000 ml.) followed with benzene-ethyl acetate (50:1) yielded 426 mg. (71%) of 3β-acetoxy-5β-buf-20(21)-enolide) (XI) M.P. 131–132° (large orthorhombic crystals from ligroin); $\nu_{max.}$ (KBr) 2960, 1770, 1730, 1650, 1260, 1130, and 1020 K; pmr 388 (s, 1p, C–21), 310 peak, 1p, equatorial 3α-proton), 150 (m, 4p, C–22 and C–23), 225 (s, 3p, acetate), 90 (methylene envelope), 60 (s, 3p, C–19), and 36 Hz. (s, 3p, C–18).

*Analysis.*—Calcd. for $C_{26}H_{38}O_4$ (414.6) (percent): C, 75.32; H, 9.24. Found (percent): C, 75.24; H, 9.24.

EXAMPLE XII

3β-acetoxy-5β,14α-bufa-20,22-dienolide (XII)

An intimate mixture of 3β-acetoxy-5β,14α-buf-20(21)-enolide and sulfur (226 mg.) is heated at 212–217° (nitrogen atmosphere) for 30 minutes; the initial melt evolves a gas ($H_2S$). The cool brown mixture is dissolved in carbon disulfide and column chromatographed through silica yel (40 g. of 0.05–0.2 mm.). Elution with benzene-ether (10:1) yields 98 mg. (43+) of product as a brown oil which gave one spot tlc. Recrystallization from methanol yielded tetragonal crystals: of 3β-acetoxy-5β,14α-bufa-20,22-dienolide (XIII) M.P. 111.5–113.5°; $\nu_{max.}$ (0.1 M $CHCl_3$) 2970, 1730 (broad), 1640, 1550, 1270 and 1030 K; pmr 442 (m, 2p, C–21 and C–23), 382 (d, 1p, $J=10.5$ Hz., C–22), 310 (peak, 1p, equatorial 3α-proton), 225 (s, 3p, acetate), 90 (methylene envelope), 60 (s, 3p, C–19), and 32.4 Hz. (s, 3p, C–18); $\lambda_{max.}$ (EtOH) 300 (log ε 3.76); mass spec 337 (44%), 352 (100%), 370 (8%), and M+ 412 (28%).

*Analysis.*—Calcd. for $C_{26}H_{36}O_4$ (412.6) (percent): C, 75.69; H, 8.80. Found (percent): C, 75.41; H, 9.06.

EXAMPLE XIII

3β,14α-dihydroxy-5β-bufa-20,22-dienolide 3β-acetate (XXa)

An 8 days old agar slant of *Helminthosporium buchloes lefebvr Johnson* (Central Bureau voor Schimmel Cultures, Baarn, Netherlands) is inoculated into two conical flasks containing 500 ml. of 20—20 medium, (Rec. Trav. Chim. 82, 121 (1963)) incubation of the flasks takes place on a rotary shaker (250 r.p.m., 25 cm. stroke). The culture is used to inoculate 10 liters of 5—5 medium. (Rec. Trav. Chim. 82, 121 (1963)) in a 20 litre stainless steel fermentor equipped with stirrer and air inlet (200 r.p.m., 10 litres/min. of air at 28° C.). Twenty-four hours after inoculation, 1.6 g. of 3β-hydroxy-5β, 14α-bufa-20,22-dienolide 3β-acetate (XII) are added. After 4 hours the mycelial mass is separated by filtration and the culture filtrate extracted with 1000 ml. of methyl isobutyl ketone. The extract is concentrated to about 25 ml., treated with charcoal and further concentrated to yield, on cooling 3β,14α-dihydroxy-5β-bufa-20,22-dienolide 3β-acetate (XXa).

EXAMPLE XIV

14-dehydrobufalin 3β-acetate (XXI)

3β,14α - dihydroxy - 5β - bufa-20,22-dienolide 3β-acetate (XX) (800 mg.) is taken up in dry benzene (50 ml.) in an apparatus fitted with a drying tube containing calcium chloride. Dry gaseous hydrogen chloride is passed into the mixture for two hours. The solvent and surplus gas are then removed by evaporation under reduced pressure. The residue is chromatographed on silica gel, elution with chloroform, evaporation of the solvent and recrystallization from hexane yields 14-dehydrobufalin 3β-acetate (XXI) M.P. 170–172° C.

EXAMPLE XV

Resibufogenin acetate

A solution prepared from chloroform (1 ml.), 14-dehydrobufalin acetate (10 mg.) and m-chloroperoxybenzoic acid (9.5 mg., 86% pure) is stirred at room temperature 4.5 hours. The mixture is diluted with ether and washed with 5% aqueous sodium hydroxide and water. Removal of solvent gives 9.8 mg. of colorless solid. Resibufogenin acetate (XXII) is isolated by preparative thin layer chromatography (1:1) ligroin-ethyl acetate mobile phase). Following elution from the silica gel with chloroform, the product is washed with 10% sodium bicarbonate, 1 N hydrochloric acid and water. Evaporation of solvent and crystallization of the residue from methanol-chloroform yields 4.0 mg. of plates and needles melting at 222–227°.

The synthetic resibufogenin acetate displays: $\nu_{max}$. 3020 (epoxide), 2970, 1730, 1340 (epoxide) cm.$^{-1}$; mass spec M$^+$ 426, 408 (M–18), 366 (M–60) m/e.

EXAMPLE XVI

Resibufogenin

An ether solution of resibufogenin acetate (XXII) (12 mg.) is mixed with activated alumina (Woelm, basic activity 3, pH approximately 8–9) and placed in a small column. Following a 24-hour period resibufogenin is eluted by ether and chloroform. Crude product weighs 9.2 mg. Recrystallization from chloroform-methanol gives 6.2 mg. of plates with a double melting point 110–121° and 148–168° (natural resibufogenin melts at 104–122° and 146–170°). The synthetic resibufogenin is identical with the natural counterpart and exhibits $\nu_{max}$. 3070, 2950, 1735, 1640, 1545 cm.$^{-1}$ and mass spec M$^+$ 384, 366 (100%), M$^±$ 18 m/e.

EXAMPLE XVII

Bufalin

The following reduction experiment is performed using dry reagents and equipment. To a solution of resibufogenin (0.105 g.) in ether (22 ml.) is added (dropwise) an ethereal (20 ml.) solution of lithium aluminum hydride (0.275 g.) Stirring and cooling at —50° is continued for 4 hours. The mixture is carefully treated with wet ether and then diluted with water. The ethereal phase is washed with 10% sodium bicarbonate, 1 N hydrochloric acid, and water (3 times). Removal of solvent gives 78 mg. of crude (5 component mixture by thin layer chromatography using 95:5 chloroform-methanol) bufalin. A pure specimen of bufalin (18 mg.) is obtained by preparative layer chromatography (95:5 chloroform-methanol mobile phase). Recrystallization from methanol-chloroform gives 12.4 mg. of needles melting at 242–243° (natural bufalin from Japan melted at 221–242° and from Switzerland 212–240°); mass spec M$^+$ 386, 368, 350, 325, 250, 232, 214, 207, 203, and 147 m/e; IR $\nu_{max}$. 3080, 2945, 1725, 1640, and 1545 cm.$^{-1}$; pmr, (at 100 mHz.) 0.71 and 0.96 (18 and 19 methyls), 4.14 (3α-proton), 6.25 (doublet, H$_a$, 10 Hz.), 7.28 (partially masked doublet, H:2 Hz.), and 8.85 (quartet, H$_b$, 10 Hz. and 2 Hz.).

We claim as our invention:

1. 3β-hydroxy-21-nor-20-cyano-5β pregnane.
2. 3-oxo-21-nor-20-cyano-5β-pregnane.
3. In the process of synthesizing bufalin from 3β-hydroxy-17-oxo-androstan-5-ene and alkanoates thereof, the steps of preparing 3 β - hydroxy-21 - nor - 20 - cyano 5β-pregnane comprising
   (1) reacting 3β-hydroxy-17-oxo-androst 5-ene 3β-formate with a cyanomethyl dialkylphosphonate and a base,
   (2) reacting the thus formed 17-cyanomethylene steroid with aluminum iso-propoxide and hydrogen in the presence of palladium on a carrier,
   (3) reducing the thus formed 3-oxo-21-nor-20-cyano-5β-pregnane with a trialkylphosphate in the presence of chloridic acid.
4. In the process of claim 3 the step wherein the 17-cyanomethylene steroid is reacted sequentially with aluminum iso-propoxide and then with hydrogen in the presence of palladium on calcium carbonate in tetrahydrofuran or acetonitrile.
5. In the process of claim 3 the step wherein the 17-cyano methylene steroid is reacted sequentially with hydrogen in the presence of palladium on calcium carbonate in a solvent, with aluminum iso-propoxide and again with hydrogen in the presence of palladium on calcium carbonate in a solvent wherein the solvent is tetrahydrofuran or acetonitrile.
6. A process according to claim 3 wherein the cyanomethyl dialkyl phosphonate is cyanomethyl diethyl phosphonate, and the base is sodium hydride.

No references cited.

ELBERT L. ROBERTS, Primary Examiner

U.S. Cl. X.R.
260—239.57, 397.5

UNITED STATES PATENT OFFICE
CERTIFICATE OF CORRECTION

Patent No. 3,661,941          Dated May 9, 1972

Inventor(s) JERRY R. DIAS and GEORGE R. PETTIT    —1—

It is certified that error appears in the above-identified patent and that said Letters Patent are hereby corrected as shown below:

Column 1, line 10, "6 Claims" should read -- 8 Claims --.

Column 1, line 41, immediately below the heading "SUMMARY OF THE INVENTION", insert the following paragraph:

--The invention described herein was made in the course of work under a grant or award from the Department of Health, Education and Welfare--.

Column 4, line 74 - delete "lactonising" insert --lactonizing--.

Column 5, line 1 - delete "p-toluene sulfonic" insert --p-toluenesulfonic--.

Column 5, lines 60 and 65 - delete "per acid" - insert --peracid--.

Column 6, line 5 - delete "diethylether" insert --diethyl ether--.

Column 6, line 6 - delete "lithiumaluminum hydride" insert --lithium aluminum hydride--.

Column 8, line 3 - delete "(through)" insert --(trough)--.

Column 12, line 14 - delete "toluene-sulfonic" insert -- p-toluenesulfonic--.

UNITED STATES PATENT OFFICE
CERTIFICATE OF CORRECTION

Patent No. 3,661,941  Dated May 9, 1972

Inventor(s) JERRY R. DIAS and GEORGE R. PETTIT

It is certified that error appears in the above-identified patent and that said Letters Patent are hereby corrected as shown below:

In the Claims

Add new Claims 7 and 8 in Column 14

-- 7. 3-Oxo-20-cyano-21-nor-pregna-4,17(20-diene)--.

-- 8. 3-Oxo-20-cyano-21-nor-pregn-4-ene--.

Signed and sealed this 8th day of May 1973.

(SEAL)
Attest:

EDWARD M. FLETCHER, JR.
Attesting Officer

ROBERT GOTTSCHALK
Commissioner of Patents